Sept. 6, 1960　　　　　R. C. HARE　　　　　2,951,505
SLIDE PLATE TYPE HYDRAULIC VALVE

Filed July 8, 1957　　　　　　　　　　　　3 Sheets-Sheet 1

INVENTOR.
R. C. Hare
BY
Lieber & Lieber
ATTORNEYS

Sept. 6, 1960  R. C. HARE  2,951,505
SLIDE PLATE TYPE HYDRAULIC VALVE
Filed July 8, 1957  3 Sheets-Sheet 2

INVENTOR.
R. C. Hare
BY Lieber & Lieber
ATTORNEYS.

Sept. 6, 1960
R. C. HARE
2,951,505
SLIDE PLATE TYPE HYDRAULIC VALVE
Filed July 8, 1957
3 Sheets-Sheet 3
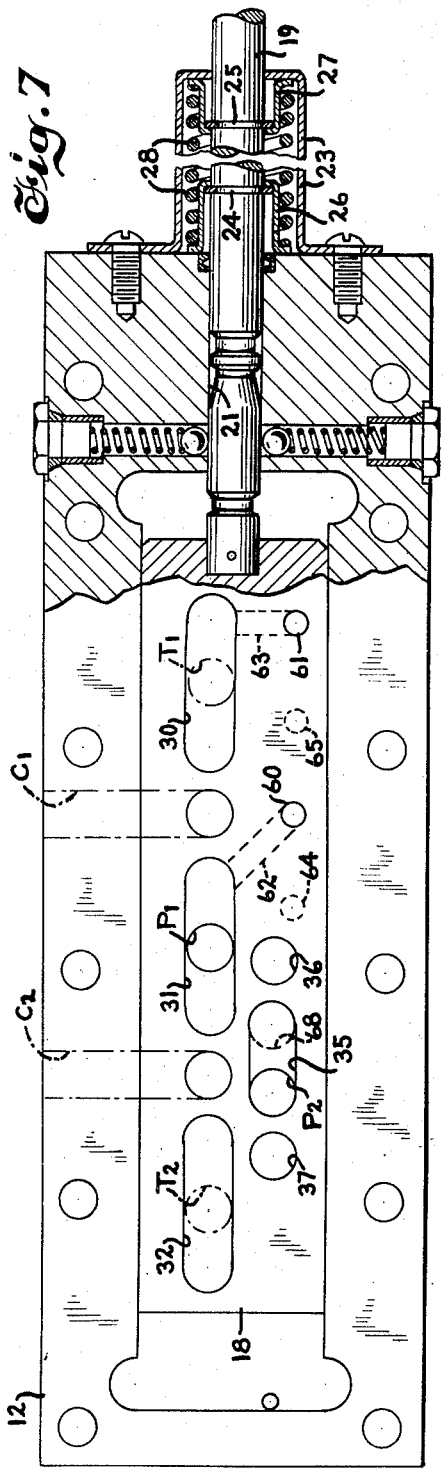
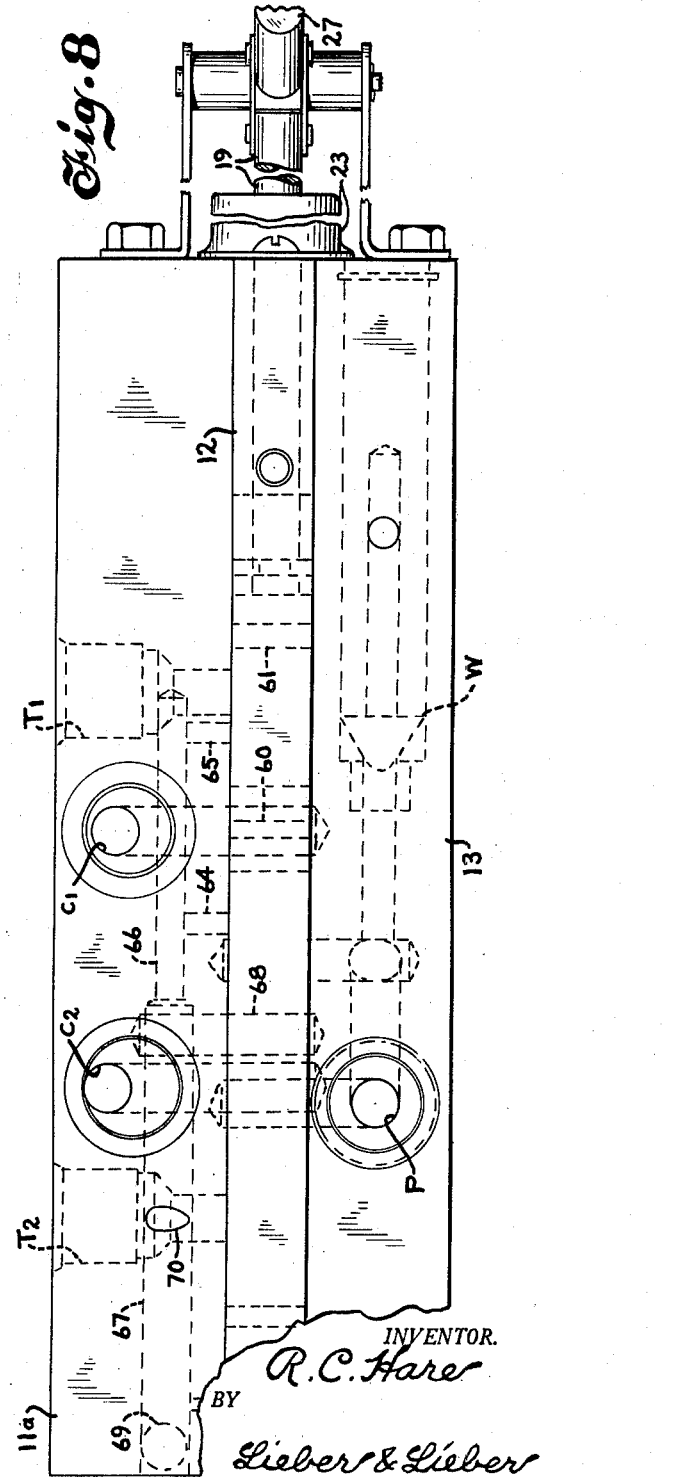
INVENTOR.
R. C. Hare
BY
Lieber & Lieber
ATTORNEYS.

2,951,505
Patented Sept. 6, 1960

2,951,505
SLIDE PLATE TYPE HYDRAULIC VALVE

Richard C. Hare, Wauwatosa, Wis., assignor to Dynex, Inc., Pewaukee, Wis., a corporation of Wisconsin Filed July 8, 1957, Ser. No. 670,440

2 Claims. (Cl. 137—621)

This invention relates to a hydraulic directional control valve of the slide plate type.

This invention finds particular utility when used in conjunction with excavating or moving equipment where a plurality of fluid motors are used to perform various operations on the machine and in different sequences, sometimes the operations being performed independently of one another and other times simultaneously. For example, in an industrial lift truck operation, it may be desirable to lift, tilt and otherwise control the load at the same time. In other situations it may be necessary to provide power separately to lift the load, steer the vehicle, or tilt the load.

In accordance with this invention, a slide plate type directional valve for a hydraulic system is provided for performing the above functions and, in doing so, giving priority of pressure to certain of the functions. In addition to the above highly flexible system made possible by this invention, various circuits may operate simultaneously at different pressure levels.

Also in accordance with this invention, and to provide a hydraulic system having the various circuits mentioned, these novel direction valves are located in the steering and load tilt circuits and are capable of delivering fluid either to their own fluid operated units or to the lift directional valve. These directional valves must have a multiple tank porting system able to withstand high tank pressures, have low leakage characteristics and incorporate a "no drop" feature. When such a directional valve is used for steering it functions automatically when an open center steering booster valve is closed, as when turning the steering wheel.

This invention provides a novel directional valve of the slide plate type having novel porting which enables the valves to be used for both series and parallel type functions.

These and other advantages will hereinafter appear as this disclosure progresses, reference being had to the accompanying drawings in which:

Figure 7 is a view similar to Fig. 3, but showing a modified form of valve which gives a fourth valve position, known as a "float" position.

Figure 8 is a view similar to Fig. 1, but of the modification of Figure 7, and showing the common tank manifolding in the cylinder-tank plate.

Figure 1:
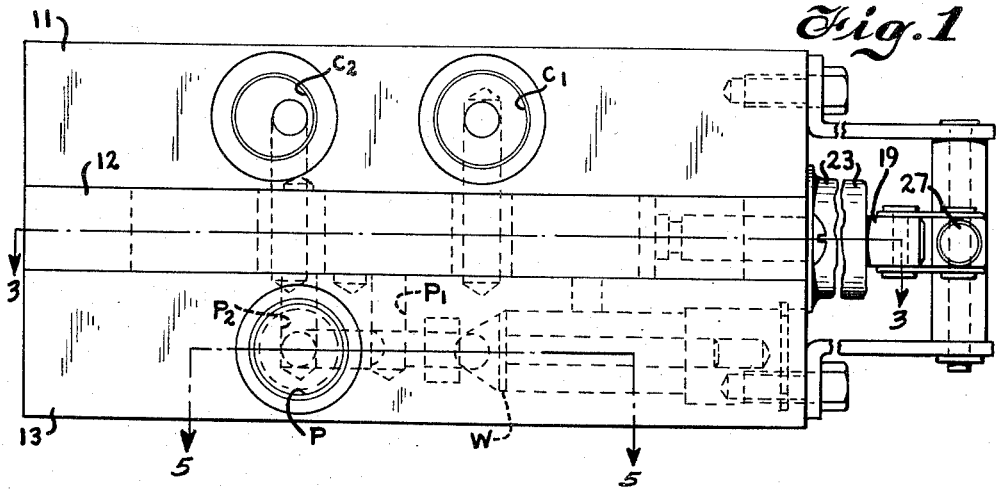
Figure 1 is a plan view of a three-position, four-way, directional valve made in accordance with the invention, showing the cylinder ports and pressure port.
Figure 2:
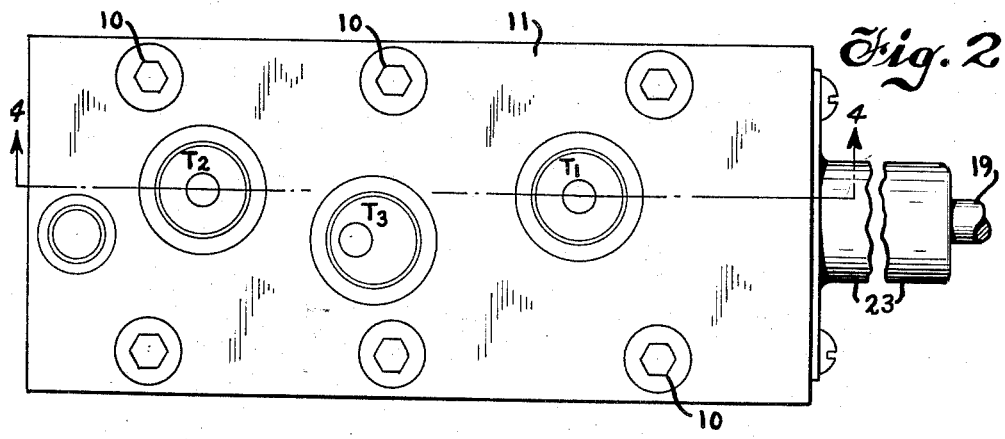
Figure 2 is an elevational view of one side of the valve shown in Figure 1 and showing the tank ports.

Referring more particularly to Figures 1–5 of the drawings, the valve housing is comprised of three parts, namely two end walls and a central spacer, fashioned from steel plate stock and secured together by a plurality of bolt means 10 extending therethrough. These three parts consist of the cylinder-tank plate 11, the central slide retainer 12, and the pressure plate 13.

The cylinder-tank plate 11 has the three tank ports T1, T2 and T3 extending therethrough which are adapted to receive fluid conduits (not shown) in their threaded portions. Plate 11 also includes the cylinder ports C1, C2 which have threaded portions on the top side of the side wall for the reception of suitable conduits (not shown).

In the pressure plate 13 is the pressure inlet port P having a series pressure inlet P2 on the upstream side of the load holding check valve 15 and a parallel pressure inlet P1 on the downstream side of the check valve. The valve 15 serves to hold the load in the cylinders or other operating units when the pressure port is open and until sufficient pressure is available in the pressure line.

The central slide retainer 12 has a large slot 16 in its center portion forming a valve chamber within the housing.

A slide plate 18 is reciprocatingly mounted within the chamber 16 and is ground and lapped to form a sliding seal fit therewith. An actuator stem 19 is connected at 20 to the slide plate 18 and extends through bore 21 and from the housing where it is axially movable by the lever 27, either manually or by a hydraulic mechanism as will appear. The slide plate may be moved to the left or right from the neutral position shown in the drawings. A bracket 23 is secured to the end of the housing and the stem 19 extends therethrough. Within the bracket the stem has a pair of spaced snap rings 24, 25 secured thereto and engaging sleeves 26, 27, respectively. A spring 28 is slipped over the sleeves and seats against a flange on the ends of the collars to urge the collars to their respective end of the bracket. The collars, carrying their associated snap ring with them, thereby urge the stem 19 and the slide plate 18 to the neutral position.

Figure 3:
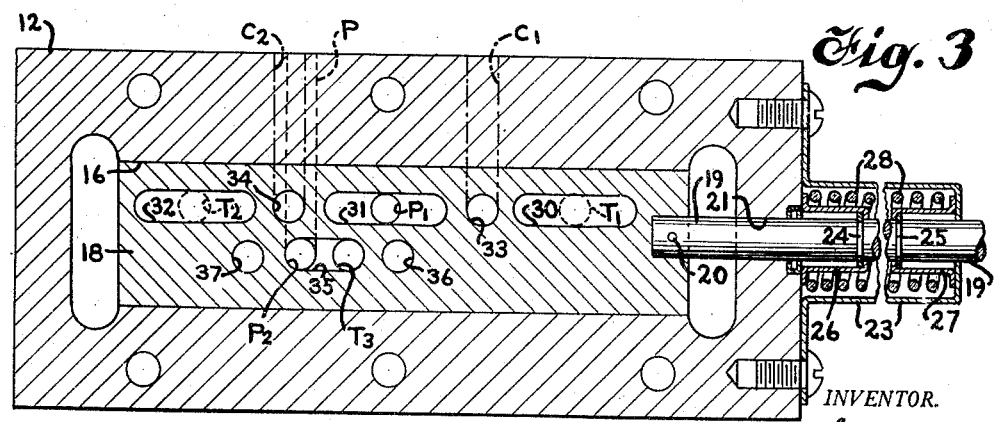
Figure 3 is a sectional taken on line 3—3 of Figure 1 and showing the valve slide plate in the neutral position, and the cylinder and tank ports superimposed in broken lines.
Figure 4:
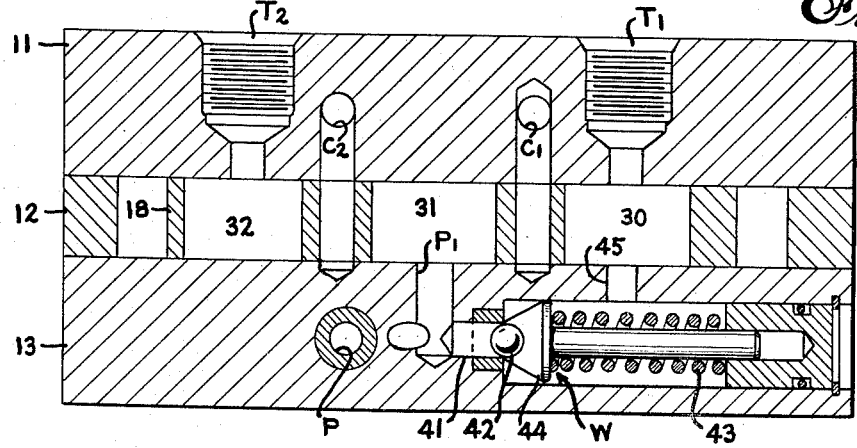
Figure 4 is a sectional view taken on line 4—4 of Figure 2, through two of the tank ports.
Figure 5:
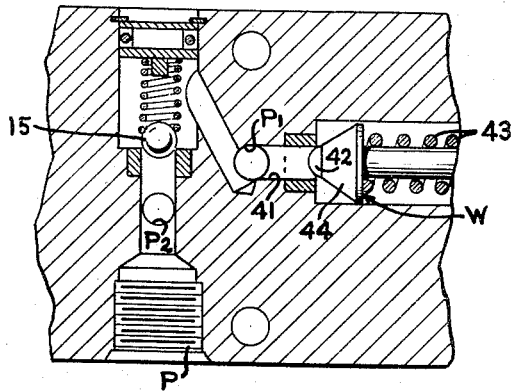
Figure 5 is a fragmentary, sectional view taken on line 5—5 of Figure 1, and showing the pressure inlet port and inlet passageways and also the relief valve.

As shown best in Figure 3, one longitudinal line of porting in the slide plate 18 comprises three longitudinally spaced slots 30, 31 and 32 and two balancing apertures 33, 34 therebetween. This line of porting is referred to as the parallel operation porting. Another line of porting includes the slot 35 and balance apertures 36, 37 on either side thereof. This line of porting is referred to as the series operating porting, as will appear more fully hereinafter. All of this porting extends entirely through the valve slide as shown in Fig. 4.

Valve Neutral

When in the neutral position shown in Figs. 1–4, pressure fluid enters port P, P1 is blocked by the neutral position of the slide plate 18, and the fluid goes through inlet P2 which is in fluid communication with tank outlet T3 through the slot 35 in the slide. The valve is thus open and no unloading valves are required in order for the fluid simply to pass through the directional valve and the valve is an open center valve in this respect. Both cylinder ports C1 and C2 are blocked by the slide and the valve is a closed center valve in this respect.

Valve to the left

When the slide plate 18 is moved to the left as viewed in Figs. 1–4, the pressure inlet P1 is placed in fluid communication with cylinder port C2 by means of slot 31, admitting fluid to one end of a slave cylinder, for example. If this cylinder is of the double acting type, fluid from the other end of the cylinder is returned through C1 which is connected with tank port T1 through slot 30. At this time pressure inlet P2 is blocked by the slide plate 18. Upon return of the slide plate 18 to neutral, fluid is locked in the slave cylinder to hold the load thereon, and fluid again flows through P2 directly to T3 via slot 35.

Valve to the right

When it is desired to admit pressure fluid to the other end of the double acting slave cylinder, the slide plate 18 is moved to the right, placing pressure inlet P1 in communication with C1 and admitting fluid pressure to the other end of the cylinder. This slide plate movement has placed the first end of the cylinder in communictiaon with the tank through C2, valve slot 32 and T2. P2 has then been blocked from T3 by the slide plate so that full pressure is going to the slave.

Upon return of the slide plate to neutral, fluid is locked in the slave, as above described, and pressure fluid again is simply routed through from P2 to tank port T3.

A standard safety type relief valve W is provided in the directional valves which are no-drop check and by-pass relief valves. This relief valve W is located in pressure plate 13 and has a passage 41 leading from the pressure inlet P1. A check ball 42 is held in seating position by the spring 43 which urges the plunger member 44 against the ball and toward the sealing position. When the pressure in P1 exceeds a predetermined amount the ball is unseated and fluid is admitted through the passage 45 (Fig. 4), into slide plate slot 30 and to tank via T1. It will be noted that the passage 45 is always open to T1 through slot 30, so that regardless of the slide plate position, the relief valve 40 may unload.

Apertures 36 and 37 in slide plate 18 are balancing holes which will be indexed to tank or pressure respectively as the slide plate is moved to the left or right.

System

Figure 6:
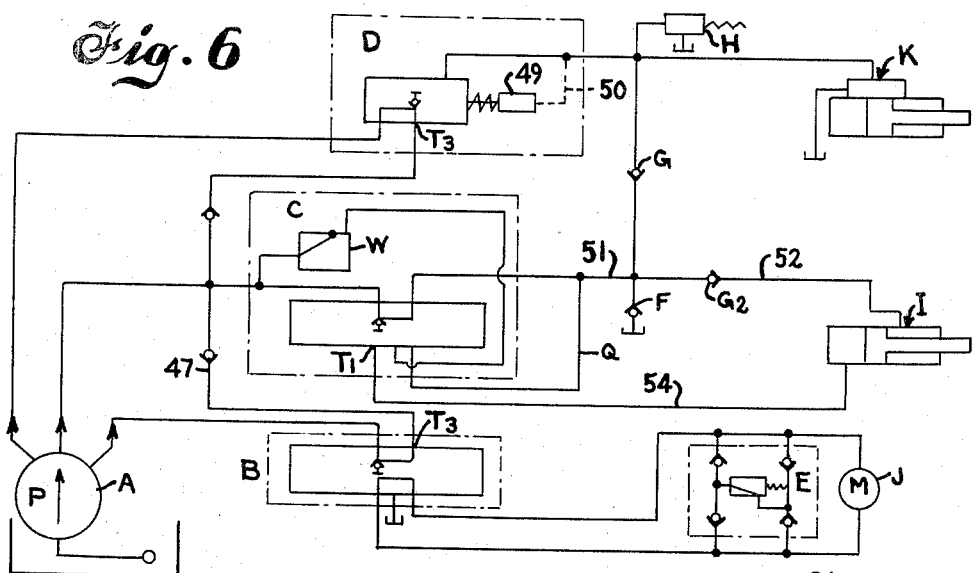
Figure 6 is a schematic circuit diagram of a hydraulic system employing three of the valves shown in Figures 1–5.

For purposes of illustrating the highly versatile nature and flexible operational characteristics of the directional valve, a schematic circuit diagram of Figure 6 will now be referred to. A hydraulic system of this type has particular utility when used on an industrial lift truck, for example.

The pump A is a six piston type in which the flow is divided internally so that three pairs of pistons deliver to their respective primary circuits.

The primary circuits chosen are for the load tilt, load lift and steering functions and have directional valves B, C and D respectively therein. These valves are connected so they deliver fluid either for their respective functions or to the inlet of the lift directional valve to give various speeds to the lift operation. It is believed apparent that the basic valve shown in Figures 1-4 is capable of series-parallel type functions depending on the phase being performed.

Load tilt

The directional valve B when in the neutral position as shown simply directs fluid pressure through the valve as above described and out through tank port T3, through conduit 47 to the directional valve C of the lift function. The pressure flow is thus combined from two of the pump outlets for the lift operation. Pressurizing any of the three tank ports will in no way reflect on the operation of motor J.

When the valve B is shifted to the left or right, as above described, pressure fluid is admitted to rotate the motor J in either direction, which in turn is adapted to tilt the load in either direction. Valve E, positioned in the transmission circuit between valve B and motor J, is a compound valve including a relief valve and four check valves, providing for relief for either direction of fluid pressure flow.

Steering circuit

The directional valve D in the steering circuit is hydraulically operated from a pilot circuit by hydraulic mechanism 49, as follows. Valve F is a relief valve set at approximately 80 p.s.i. When the operator biases valve K in steering the vehicle, the valve F maintains a back pressure of 80 p.s.i. in line 51 from valve C, and this pressure is available to the hydraulic mechanism 49 to actuate valve D. Upon actuation, valve D directs pressure fluid to valve K to operate the steering function. In other words, oil is forced to flow through valve G and the open center of the steering booster valve K to tank. When valve K is closed, upon turning movement of the steering wheel, pressure in the secondary circuit (valves D, F and K) is raised to 80 p.s.i. Fluid pressure is then directed through conduit 50 to cause mechanism 49 to shift valve D to permit pressure fluid to flow from pump A to valve K, thus operating the steering function. Thus the steering directional valve D functions automatically when the open center steering booster valve K is closed.

By incorporating this four-way feature in all the valves B, C and D, the steering circuit will always have priority on pump delivery over the lift section.

The relief valve H in the secondary circuit is set at 1000 p.s.i. in this particular installation.

The line 52 from cylinder I through check valve G2 to relief valve F is provided to maintain volume in the steering circuit. The rod end of cylinder I is kept full of oil so that a source of pressure is laways available for the pilot valve K.

Lift circuit

The directional valve C for the lift circuit is basically similar to valves B and D but also uses the no-drop check and by-pass relief valve W. When several of these directional valves are used, as in the circuit as shown, the relief valves W in the valves B and D are blocked out. Only one valve W is required in the system to provide main circuit protection.

When valve C is in the neutral position, pressure fluid flows directly from pump A, through valve C and to the relief valve F.

When valve C is moved to the left, pressure fluid is directed from pump A through valve C via line 54 to the head end of cylinder I to lift the load. Fluid from the rod end of the cylinder I is directed either to tank via line 52 or to the steering circuit, depending on the position of valve K. When the valve K is open, as when no steering is taking place, the fluid is directed to tank. When valve K is closed, as when steering, fluid is directed to the steering circuit.

On shifting valve C to the right, fluid from pump A is delivered through cylinder line Q to valve F. The load is allowed to drop by delivery of fluid from cylinder I through line 54 and to tank through the tank port T1 of valve C.

General

With the above described directional valve construction, it is possible to install several of the valves and have separate pressure lines for each valve as shown in the circuit and the three tanks are separate from and independent of one another. Fluid flow may be diverted directly through one valve and the valves downstream can be used in parallel operation. When using a pump with split delivery, as shown, pressure fluid is available at all times to each of the directional valves for independent operation thereof yet priority of pressure fluid may be given to certain of the valves over the others.

In operation, the operator can manually bias one of the slide plates part way until he feels or sees how the load is moving. At the same time he can similarly regulate the rate at which fluid is admitted through other of the directional control valves and thus vary and coordinate the corresponding movements of the various parts, as when lifting or tilting in either direction. In other words, by means of this parallel operation of the valves, the operator can lift, tilt and otherwise control the load simultaneously, by moving the slide plate a portion of its travel.

Stated otherwise, with this particular type of parallel operation valve arrangement, and the split delivery from the pump, pressure is applied to all the valves in the circuit and when there is pressure at one valve there is pressure at all valves. In a true parallel arrangement of valves in a system, if fluid pressure were applied to the valves, the one with the lighter load and requiring less power would be moved first. Only after this first demand was satisfied would the second valve get the pressure fluid it required. In a series type operation when one valve upstream is calling for pressure fluid, it only will get the fluid and the remainder of the valves down stream would not be operative.

If two or more valves are thus used in parallel as described, several functions can be performed, that is, the pressure fluid can be divided between the functions in varying amounts.

*Float position (Figs. 7 and 8)*

The valve may also be connected in a "standard" manner where all the tanks are connected together as will appear below. With this "standard" installation, however, a combination series-parallel type of function would be available when two or more valves are used.

The "standard" set-up shown in Fig. 7 finds particular utility in larger capacity valves. The valve of Fig. 7 in addition to the "neutral, lift and lower" positions available with the valves of Figs. 1–4, affords a fourth position.

This float position is used, for instance, when it is desired to have the load "float" on the ground, as for example, when it is desired to simply drag the loader bucket over the ground. In this position, the fluid pressure in both cylinder ends are connected into a common tank arrangement as follows.

For the purpose of providing a common tank manifold for the fourth position, additional holes 60, 61 are drilled in plate 18 on a third line of porting. These "float" holes 60, 61 are connected with slots 31 and 30, respectively, by the passages 62, 63 in the slide plate. When the slide is in any of the first three positions, i.e., neutral, lift or lower, the holes 60, 61 are blocked and inoperative.

When the slide is moved all the way to the left (additional travel of the slide has been provided for in this modification) to the fourth or "float" position, holes 60, 61 then register with holes 64, 65 respectively in the cylinder-tank plate 11a. Holes 64, 65 are connected by the longitudinal bore 66 and its larger counterbore 67 to the tank outlets T1 and T2. A plug 69 seals the end of counterbore 67. When the slide is in this extreme left position, cylinder ports C1, C2 are indexed through slot 30, holes 63, 61, 65, 66 and through slot 31 and holes 62, 60, 64 and 66, respectively. At this time balance hole 36 connects the inlet P2 to tank port 68 which in turn is in communication with the common tank bore 67.

Thus, when the particular cylinder-tank plate 11a is used, as shown in Figs. 7 and 8, the tank ports are all connected to a common tank to provide this "standard" installation. The valve in this float position is completely open or in a true open-center position. The pressure inlets P2 and P1 are connected to tank and the other valves are inoperative resulting in a series type operation of the valves in the circuit.

Various modes of carrying out the invention are contemplated as being within the scope of the following claims particularly pointing out and distinctly claiming the subject matter which is regarded as the invention:

I claim:

1. A slide plate type hydraulic valve including a cylinder-tank plate, a center slide retainer plate and a pressure plate all rigidly secured together to form a housing, said retainer plate having an elongated slot defining a valve chamber, said cylinder-tank plate having a pair of cylinder ports extending from said chamber to the exterior of said housing and also having three tank ports extending from said chamber to the exterior of said housing, said pressure plate having a parallel pressure inlet and a series pressure inlet in communication with the exterior of said housing and terminating in communication with said chamber at spaced locations, a slide plate in said chamber for reciprocation between a center neutral position and left or right pressure fluid directing positions, said slide having three elongated slots along its length and when moved to one of said fluid directing positions, one of said slots places said parallel pressure inlet in communication with one of said cylinder ports and a second of said slots places the other of said cylinder ports in communication with one of said tank ports, when said slide is moved to the other of said fluid directing positions, said one slot places said parallel pressure inlet in communication with the said other of the cylinder ports and the third said slot places said one of the cylinder ports in communication with another of said tank ports, said slide also having a pressure balancing hole extending therethrough between each of adjacent slots, said slide adapted to block the series pressure inlet when said slide is moved to one of said fluid directing positions and is adapted to block the third of said tank ports when moved to the other of said fluid directing positions, said slide when in said neutral position is adapted to block said parallel pressure inlet and said cylinder ports, said slide also having a series operation elongated port which places said series pressure inlet in fluid communication with said third tank port and also having a pressure balancing hole extending therethrough and on each side of said elongated port which are selectively communicable with said series pressure inlet through said elongated port.

2. A slide plate type hydraulic valve including a cylinder-tank plate, a center slide retainer plate and a pressure plate all rigidly secured together to form a housing, said retainer plate having an elongated slot defining a valve chamber, said cylinder-tank plate having a pair of cylinder ports extending from said chamber to the exterior of said housing and also having three tank ports extending from said chamber to the exterior of said housing, said cylinder-tank plate also having means for connecting said tank ports together, said pressure plate having a parallel pressure inlet and a series pressure inlet in communication with the exterior of said housing and terminating in communication with said chamber at spaced locations, a slide plate in said chamber for reciprocation between a center neutral position and left or right pressure fluid directing positions, said slide having parallel operation porting including three axially spaced slots therethrough and also including a pressure balancing hole between said slots, whereby said slide when moved to one of said fluid directing positions places said parallel pressure inlet in communication with one of said cylinder ports and places the other of said cylinder ports in communication with one of said tank ports, said slide when moved to the other of said fluid directing positions places said parallel pressure inlet in communication with the said other of the cylinder ports and places said one of the cylinder ports in communication with another of said tank ports, said slide adapted to block the series pressure inlet when said slide is moved to one of said fluid directing positions and is adapted to block the third of said tank ports when moved to the other of said fluid directing positions, said slide when in said neutral position is adapted to block said parallel pressure inlet and said cylinder ports, said slide also having a series operation port which places said series pressure inlet in fluid communication with said third tank port, said slide plate being adapted to move to a float position, said slide plate having a pair of float holes adapted to place said parallel pressure inlet and one of said cylinder ports in communication with said tank ports when said slide plate is moved to said float position, said plate also having a balance hole adapted to place said series pressure inlet in communication with said tank ports when said plate is moved to said float position.

References Cited in the file of this patent

UNITED STATES PATENTS

| | | |
|---|---|---|
| 847,028 | Springer | Mar. 12, 1907 |
| 1,775,856 | Hauser | Sept. 16, 1930 |
| 2,247,141 | Twyman | June 24, 1941 |
| 2,552,848 | Gabriel et al. | May 15, 1951 |
| 2,586,932 | Gardiner et al. | Feb. 26, 1952 |
| 2,610,022 | Meddock | Sept. 9, 1952 |
| 2,875,782 | Lee | Mar. 3, 1959 |